April 21, 1964 D. W. MOLINS 3,129,547
COLLECTION OF CIGARETTES FOR PACKING
Filed Oct. 23, 1961 9 Sheets-Sheet 5

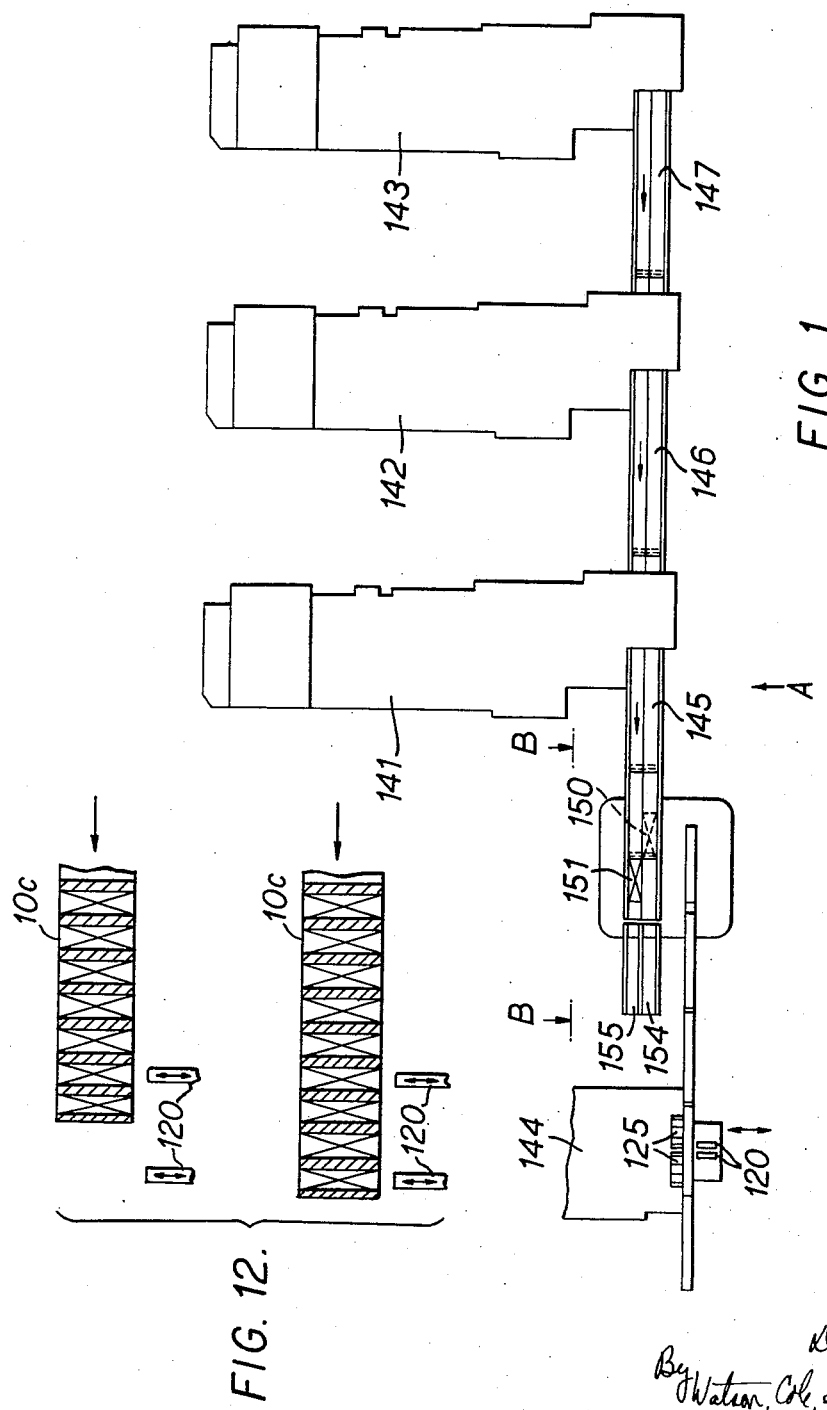

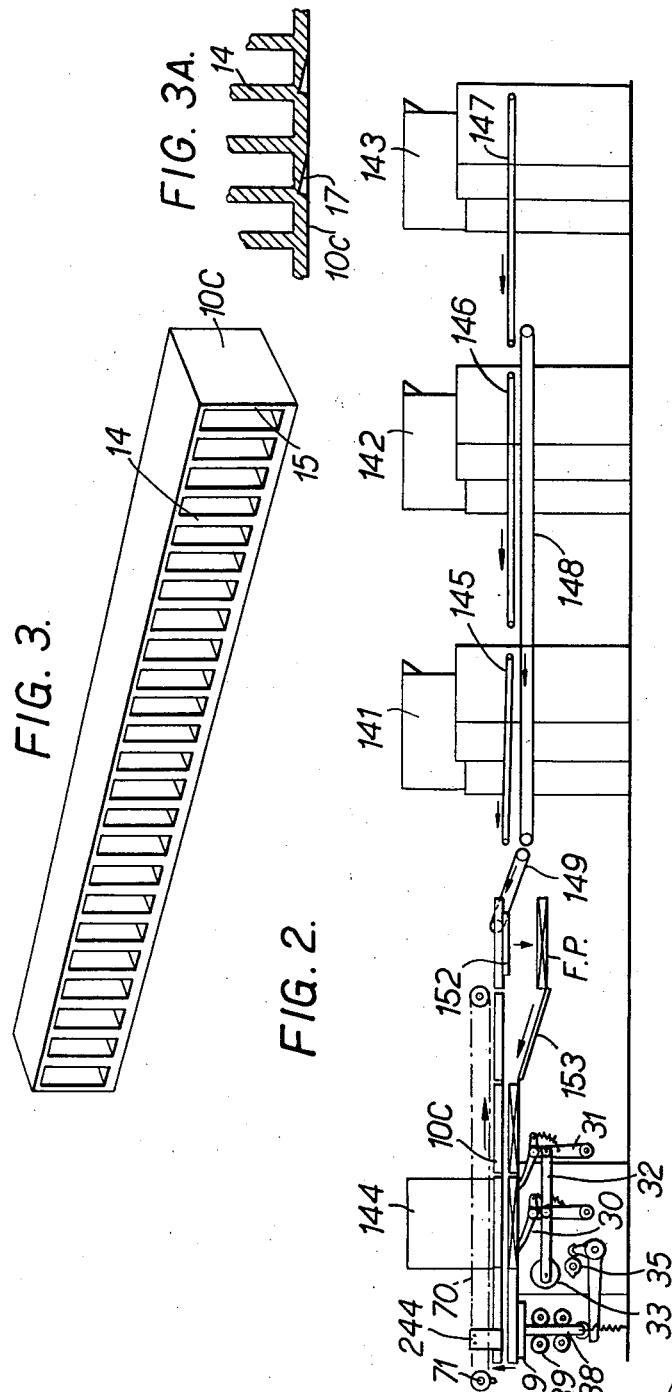

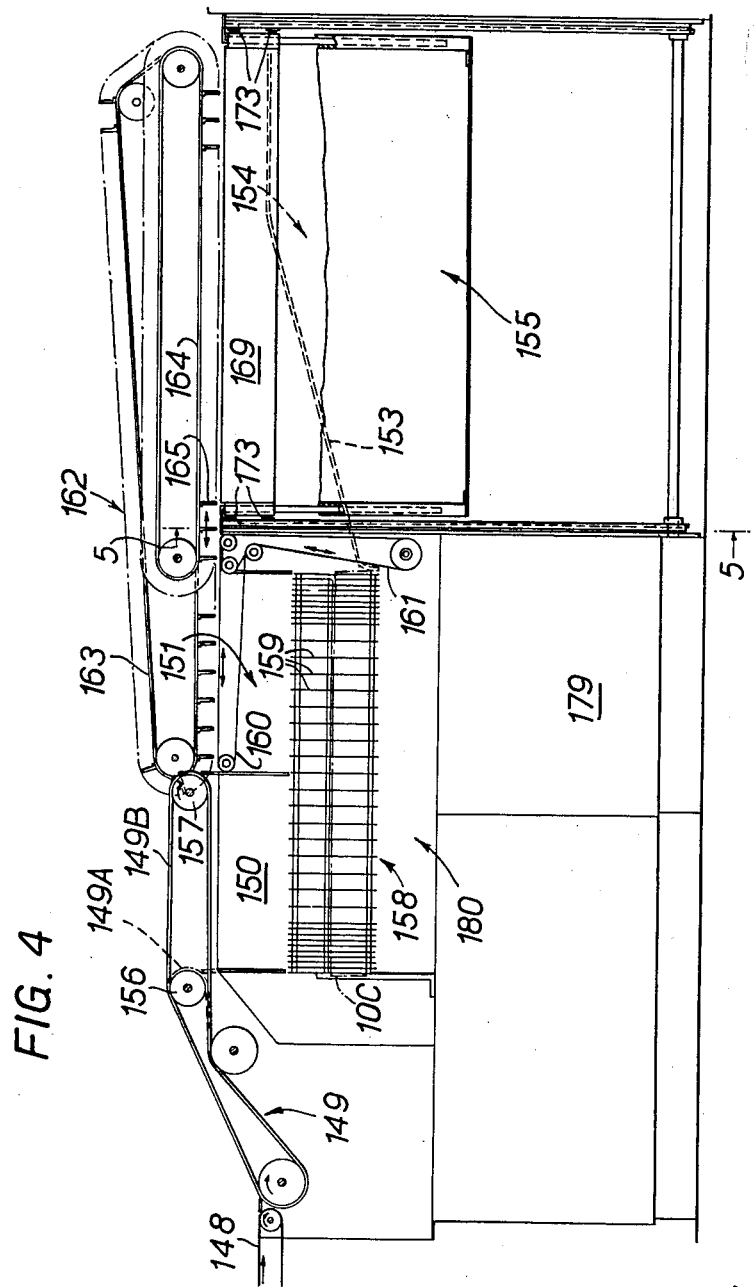

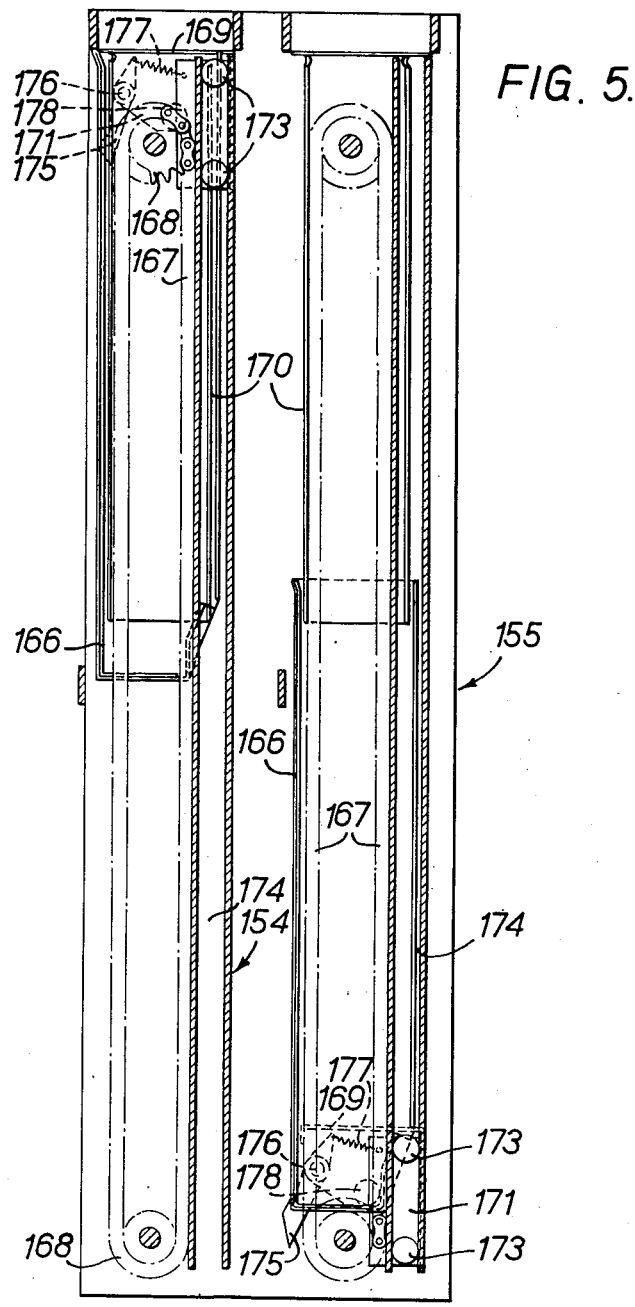

INVENTOR
Desmond W. Molins
By Watson, Cole, Grindle & Watson
ATTORNEYS

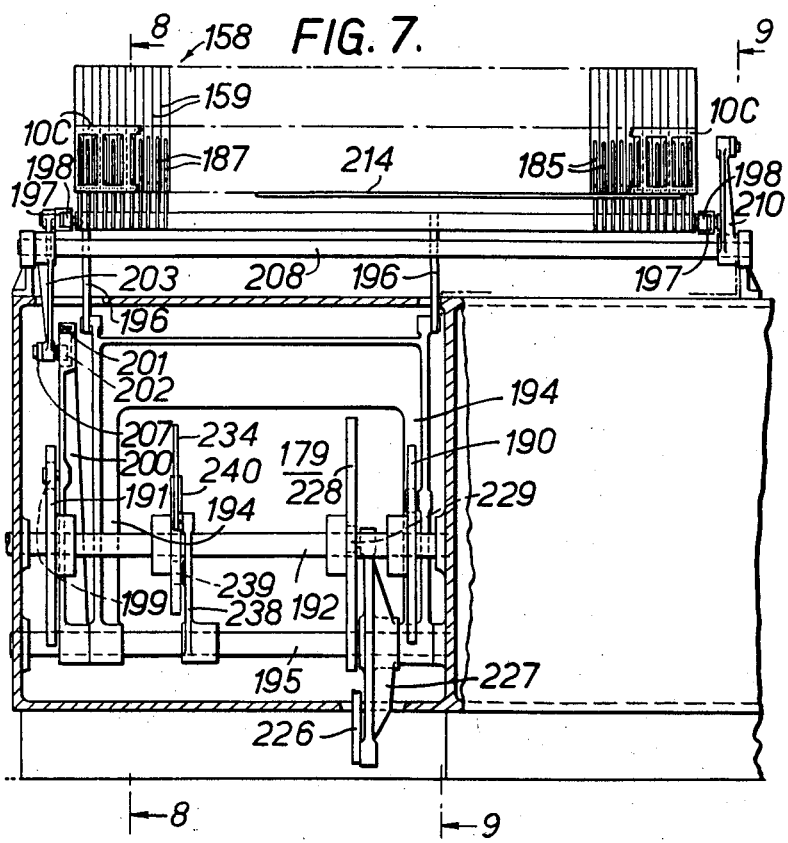

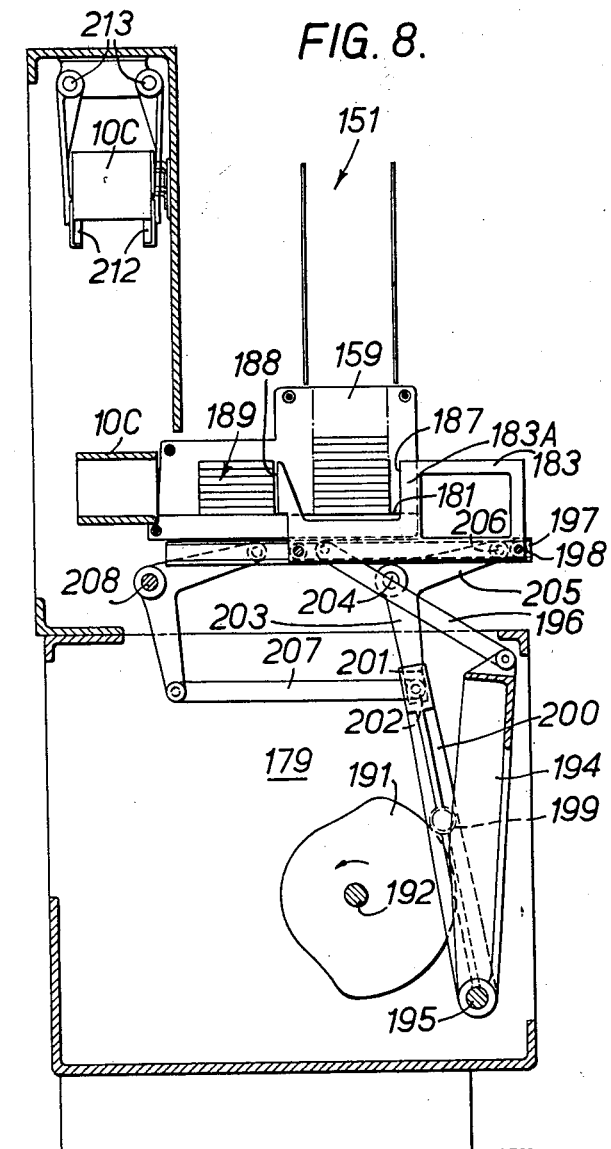

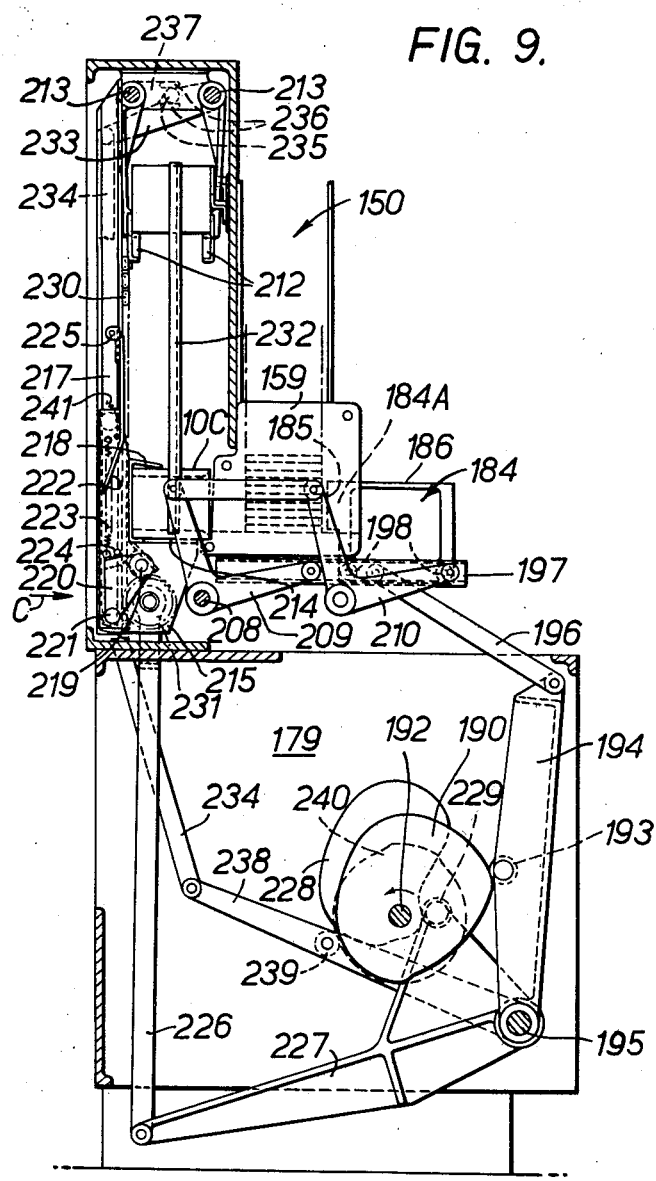

April 21, 1964  D. W. MOLINS  3,129,547
COLLECTION OF CIGARETTES FOR PACKING
Filed Oct. 23, 1961  9 Sheets-Sheet 9

INVENTOR
Desmond W. Molins
By Watson, Cole, Grindle+Watson
ATTORNEYS

United States Patent Office 3,129,547
Patented Apr. 21, 1964

3,129,547
COLLECTION OF CIGARETTES FOR PACKING
Desmond Walter Molins, Deptford, London, England, assignor to Molins Machine Company Limited, London, England, a British company
Filed Oct. 23, 1961, Ser. No. 146,801
Claims priority, application Great Britain Oct. 25, 1960
2 Claims. (Cl. 53—151)

This invention concerns improvements in the collection of cigarettes for packing, that is the collection of cigarettes produced by a cigarette making machine and their delivery to a packing machine.

Many attempts have been made at providing satisfactory methods and apparatus for this class of work but they either involve a great deal of machinery or the cigaretes are roughly handled in the process. An object of the invention is to provide relatively simple apparatus for doing this work and above all to handle the cigarettes as little as possible in the process.

According to the invention there is provided a method of collecting cigarettes from a cigarette making machine, in which the cigarettes are moved endwise in batches ready for packing into a multi-cellular, rigid, portable container or charger, into each cell of which a batch suitable to fill a packet is thrust, whereafter the filled charger is carried to the packing machine where each batch is moved endwise out of a cell of the charger as the first stage of the packing operation.

Normally, all the cells of the charger are filled at the same time. Transfer of the charger from the cigarette machine to the packing machine can be performed manually, or in any convenient way, but, where the factory layout permits, the packing machine may be positioned near the cigarette machine for direct mechanical transfer of the chargers, as in the apparatus described later. By this method of operation the cigarettes are gathered into batches at the earliest time possible and safely held against injury until they enter the packing apparatus.

Apparatus for carrying out the method set forth above comprises a cigarette machine having a catcher band, a cigarette-feeding hopper positioned to receive cigarettes from said band, the hopper having a number of slots in its base through which cigarettes can pass out of the hopper, and a surface below the hopper to support the cigarettes in the slots, a pusher movable through the slots to remove a batch of cigarettes therefrom by endwise movement, a cigarette charger and means (for example a platform) for holding it in position to receive the removed batches in its cells, and means for removing a filled charger and delivering it to a packing machine having a pusher arranged to move through a cell of the charger to remove a batch and carry it to the packing devices of the machine.

The machine arrangement adopted depends on the respective outputs of the machines and the requirements of the user. If ordinary cigarette machines are used the output of two cigarette making machines can be handled by an ordinary packing machine. If, however, the cigarette machine outputs are of the order now obtainable with some machines, a duplex packing machine can be used.

The coupling of a cigarette maker and a cigarette packer gives rise to a difficulty for it is necessary to keep the separate units running at their maximum efficiency which means that a decline in output, or stoppage of one unit should not detract from the efficiency of the other unit. This means that the output of the unit which continues to run must be maintained. The invention provides means to this end.

Further according to the invention there is provided an automatic cigarette making and packing plant operating according to the method set forth and comprising the apparatus first set forth and including means for feeding empty chargers one at a time to the position where they receive cigarettes removed from the hopper, and means for removing a filled charger from said position on to a conveyor arranged to carry it to the packing machine, whereupon the first said means feeds another empty charger into the cigarette receiving position.

Detecting a whole or partial failure of cigarette supply is best done at the hoppers, say by a photo-cell in the well-known manner. This may be arranged to indicate a minimum level of cigarettes in the hoppers, an important matter since it is very troublesome if the cigarettes are exhausted enough to empty the hopper slots as these must be refilled by hand.

In general the plant just recited will comprise two or more cigarette machines delivering cigarettes to a common hopper and if high speed machines are used the packing machine will be of a duplex type.

Where a duplex packer is used it may be convenient to empty two cells of the charger simultaneously as will be described later.

The charger cells are so shaped as to closely embrace a batch and prevent it from losing its size and formation, that is the charger cells have four sides but one broad side may be slotted if the type of pusher used on the packing machine requires it.

To cover periods when the packing machine is stopped the invention includes devices for accumulating cigarettes in a reservoir and dispensing them as required and for this purpose an automatic cigarette making and packing plant comprises a cigarette machine arranged to deliver cigarettes to a hopper, with means for filling chargers from said hopper, a reversible conveyor having pushers on it adapted to remove any surplus accumulated in the hopper to a reservoir, said reservoir having a movable cigarette support and means for moving the support downwards as cigarettes are delivered into the reservoir and for moving the support upwards when cigarettes are to be dispensed, and means for reversing the direction of movement of the conveyor when cigarettes are to be dispensed. A hopper may have a moving band at one side which coacts with said reversible conveyor to feed surplus cigarettes thereto.

In one arrangement of this character three cigarette machines are arranged to supply a duplex hopper and thus a very large output is obtainable with an economical labour force and minimum floor space.

Inspection of the ends of cigarettes may be carried out while the batches are in the chargers by known ends detecting devices but generally it is more convenient to transfer batches one at a time to pockets of a rotatable turret in which end inspection can take place in a manner well known in the art.

The invention will be more fully described with reference to the accompanying drawings which show an arrangement for carrying it into effect and in which:

FIGURE 1 is a diagrammatic plan view of an arrangement of three cigarette machines feeding one packer, and operating according to the method set forth.

FIGURE 2 is an elevation of FIGURE 1 looking in the direction of the arrow A.

FIGURE 3 is a perspective view of a charger used in the arrangement shown in FIGURES 1 and 2.

FIGURE 3A is a fragmentary section of the lower part of the charger shown in FIGURE 3.

FIGURE 4 is an outline drawing of charger filling mechanism employed in the arrangement shown in FIGURE 1.

FIGURE 5 is a sectional view on line 5—5 of FIGURE 4 showing further constructional details.

FIGURE 7 is a view looking from the back of FIGURE 4 and showing pushing mechanism.

FIGURE 8 is a section of FIGURE 7 on the line 8—8.

FIGURE 9 is a section of FIGURE 7 on the line 9—9.

FIGURE 12 shows how two batches of cigarettes may be simultaneously ejected from a charger.

Figure 6:
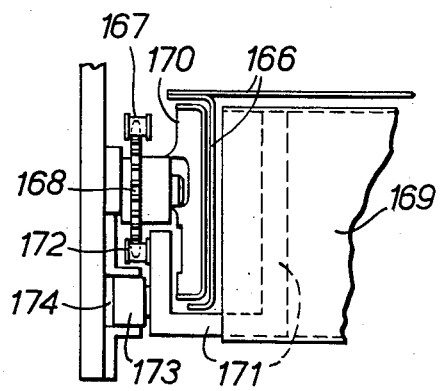
FIGURE 6 is a plan of part of FIGURE 5.

Referring first to FIGURE 3 the charger 10C consists of a long multi-cellular carrier made of light but strong material so that it is fairly rigid and it has a number of cells such as those shown, each cell having a cross-section equal to the cross-section of a batch of cigarettes, the cells surrounding the batch on all four sides. Between the cells there are partition walls 14 and the end walls of the charger which are marked 15 are half the thickness of the walls 14 so that when the chargers abut, end to end, the pitch of the cells is uniform throughout the whole arrangement of the charger. The chargers shown are made of a suitable strong plastic material but it is conceivable that they could be made of light metal such as aluminium, the essentials being that the chargers should retain their shape and rigidity in view of the fact that they may have to be carried about the factory and will be subjected to many feeding operations during their lives. The charger illustrated in FIGURE 3 is suitable for batches of twenty cigarettes in three rows of 7—6—7. If a 7—7—6 pack is required, one lower corner of a cell may have an interior projection occupying the same space as a cigarette so that the row with cigarettes is snugly held. Batches are ejected from such cells by reciprocating pushers, as is now very common in the cigarette packing art, since it facilitates inspection of the ends of the cigarettes just before packing but in older types of packing machines, batches for packing are commonly removed from a cigarette-feeding hopper by pushers on a chain conveyor, so chargers for use on such packing machines have their cells with the long sides horizontal and the bottom wall of a cell slotted so that the pusher stem, which connects the pusher to the chain conveyor, can pass through.

When, as mentioned earlier, batches are transferred from cells such as those shown in FIGURE 3 to a rotatable turret so that the ends of the cigarettes can be inspected, the turret can be rotated through an appropriate angle to bring the batch to lie on the packing machine bed with its broad sides horizontal. The charger is notched as shown in FIGURE 3A so that it may be moved endwise in stages by driving pawls.

The general method of operating can be followed from FIGURES 1 and 2 which are small-scale layouts.

In FIGURES 1 and 2 three cigarette machines 141, 142 and 143 are shown whose output is used to fill chargers which are eventually delivered to a packing machine 144, which is a duplex machine, that is, it fills two side-by- side packets at once, and has twin turrets 125 into which batches of cigarettes are ejected from the charger in the same way as batches of cigarettes are ejected from hoppers in conventional packing machines.

Each cigarette machine has catcher bands arranged to convey the cigarettes in two rows. The bands are shown at 145, 146 and 147 in FIGURES 1 and 2 and a central line indicates that each band carries two rows. The three catcher bands discharge their cigarettes on to a common collecting band 148 which at its left-hand end, FIGURE 1, delivers the cigarettes to a conveyor device generally indicated by the reference 149, FIGURE 2, which slopes upwards and discharges the cigarettes into staggered hoppers 150 and 151 FIGURE 1. Chargers are filled at the position F.P. shown just beneath the vertical arrow in FIGURE 2 and move as indicated by the sloping arrow to the packing machine and when empty are returned from the packing machine on a substantially horizontal line about level with the top of the band 149, FIGURE 2 and move down to the filling position F.P. as shown. Empty chargers are indicated by plain rectangles while full ones have a cross drawn in the rectangle.

Figure 11:
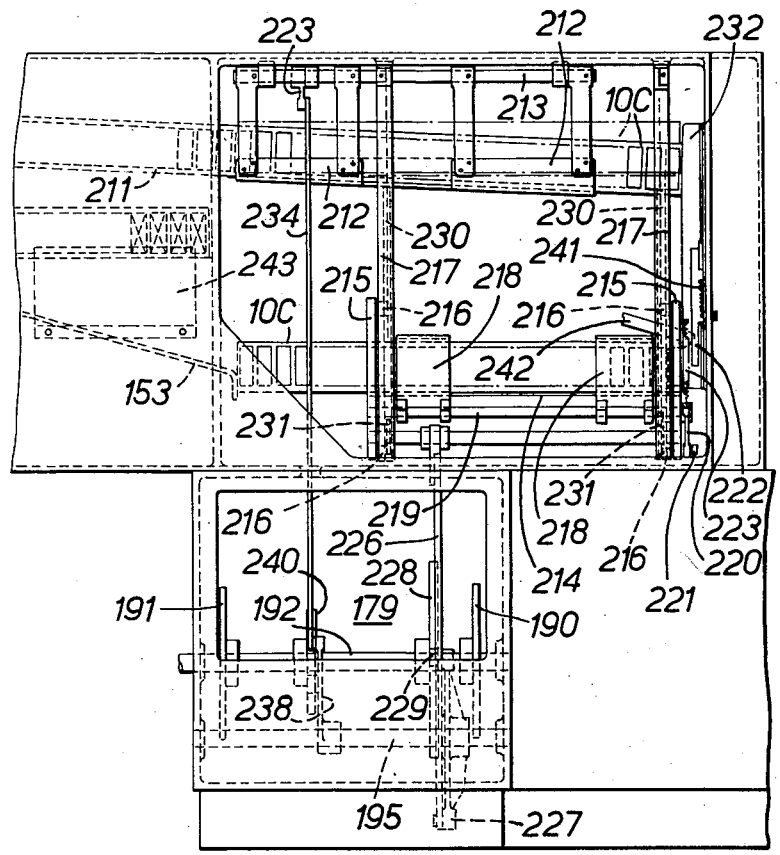
FIGURE 11 is a view looking in the direction of the arrow C FIGURE 9.

A supporting device shown diagrammatically as a platform 15 in FIGURE 2, and described in detail later with respect to FIGURE 11, supports a charger during its downward movement. After a charger has been filled it is dragged up a slope 153 in such manner that its horizontal disposition is preserved, as will be explained later when FIGURES 4 and 11 are described. When a charger has been emptied at the packing machine stage by stage as described later it is finally positioned at the extreme left of FIGURES 1 and 2 and it is then moved upwards, as seen in FIGURE 2, in the direction of the arrow to the aforesaid level along which it returns to the filling position.

The arrangement includes means for accumulating and dispensing cigarettes as the packing machine, or a cigarette machine respectively, stops and this is indicated diagrammatically in FIGURE 1 by two reservoirs 154 and 155, one for each hopper.

The arrangements outlined above with reference to FIGURES 1 and 2 for supplying cigarettes to the hoppers 150 and 151 and the accumulating and dispensing of cigarettes in and from the reservoirs 154 and 155 are shown in somewhat greater detail in FIGURE 4 but this figure also is necessarily a general outline because of the large size of the structure and each portion of it is explained later with reference to the succeeding figures which include large-scale sections of various portions.

It will be observed from FIGURES 1 and 4 that as the hoppers 150 and 151 are staggered and also at different distances from the end of the collecting band 148, the sloping conveying device generally indicated at 149, FIGURE 2, is of duplex nature, one short band 149A turning round a pulley 156 and a longer band 149B turning round a pulley 157. Cigarettes are discharged from the short band into the hopper 150 and from the long band into the hopper 151. It will be understood that these hoppers comprise the normal agitating and other devices used in cigarette-feeding hoppers whereby the incoming cigarettes are spread across the hoppers but these are omitted for clearness.

The hoppers are provided with partitions or vanes to provide slots down which cigarettes pass from the hopper in the usual way and in FIGURE 4 the whole partition assembly is marked by the reference 158 it being understood that the set of vanes for each hopper lies beneath its hopper so that the two sets are staggered, like the hoppers shown in FIGURE 1 a common pusher is employed for removing cigarettes from the slots of both sets of vanes. The vanes are marked 159 and at each end of the assembly are shown close groups of vanes arranged for supplying three rows of cigarettes to enter each charger cell as a batch but at the middle of the view only the outer vanes for each batch are shown, to avoid obscurity.

At the right hand side of the vane assembly two belts 160 and 161 are shown, one 160 being longer than the other. These belts are provided to receive surplus cigarettes should the packing machine stop while the cigarette machines are all delivering cigarettes to the collecting band 148. Thus the long band 160 takes surplus from hopper 150 and the short band 161 from hopper 151. Above the bands is arranged a conveyor system 162 consisting of two endless reversible conveyors 163 and 164 each of which has blades 165 on it constituting cigarette pushers. When the lower runs of the conveyors are moving to the right in FIGURE 4 they drag cigarettes from the bands 160 and 161 into the reservoirs 154 and 155. The reservoir 154 is behind 155 and cannot be seen in this view so the reference has a broken lead line and arrowhead. When the cigarette supply diminishes, the conveyors move in the opposite direction and carry cigarettes from the reservoirs into the respective hoppers. The operations will now be described in more detail.

In FIGURE 5 can be seen details of the two reservoirs 154 and 155. Each reservoir comprises a tray-like guide member 166, hereafter called the guide tray, which is movable up and down by a chain conveyor 167 mounted on sprocket wheels 168. Both reservoirs are alike but for convenience the figure shows one guide tray up and one down, although in practice they move together. Cigarettes are actually supported on platforms 169 attached to the chains and the purpose of the guide trays 166 is to guide and support each cigarette mass as it accumulates on a platform. At the top of the view is a channel guide 170 which remains fixed while the guide tray slides over it. The construction is clearer from the plan view, FIGURE 6, where it will be seen that each platform 169 has a bracket 171 fixed to it which is attached at 172 to the chain and also carries rollers 173 which run in a guide channel 174. To the bracket 171 is attached a catch device comprising a catch 175, FIGURE 5, pivoted at 176 and urged towards its operative position (shown at the bottom right-hand corner of the figure) by a spring 177. This catch is omitted from FIGURE 21 but it is attached to the part of the bracket 171 which is shown in dotted lines.

In operation, the sprocket wheels are driven so that the platform moves down the guide tray 166 at a rate suitable to cause the cigarettes to become housed in the guide tray 166 and when this becomes full, further downward movement of the platform carries the guide tray down with it. The cigarette mass is then moderately well controlled at its upper part by the channel guides 170. Thus the platform can move down the guide tray as far as is shown at the right-hand side of the figure. The lower left-hand corner (as seen in the drawing) of each guide tray has a hole in it through which the catch 175 can spring as soon as the platform has moved right down into the guide tray so that when the platform is required to move upwards it will take the tray with it. When the tray 166 moves up as far as the position shown at the left-hand side of the view the catch is tripped and thereafter the platform can move up to the top position shown.

A ball or roller catch, not shown, supports the tray 166 in the up position and as the platform approaches the bottom of the tray a roller 178 is forced against the tray side and bottom to cause the ball catch to release the tray and at the same time the catch 175 protrudes through the hole in the tray and the platform and tray continues to move down together until such time as the guide tray returns to the up position when the catch 175 is tripped as the platform continues to move upwards while the guide tray remains stationary and the tray is again retained by the ball catch.

On FIGURE 4 the part marked 179 is a box containing cams and other parts of the mechanism, these being shown on FIGURES 7, 8, 9.

A space marked 180 in FIGURE 4 contains pusher devices for ejecting cigarettes from the slots between the vanes, these pushers being shown in detail in FIGURES 8 and 9.

Figure 10:
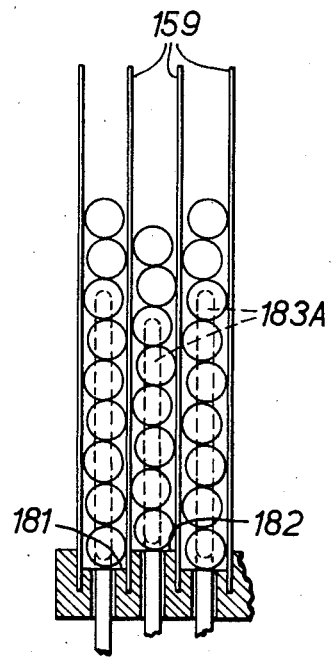
FIGURE 10 is a sectional view showing details of a pusher device and vanes for feeding batches of 7—6—7 cigarettes.

Referring now to FIGURES 7 to 10, cigarettes from the hoppers 150 and 151 move down through the slots between the vanes to surfaces 181 and 182, see FIGURE 10, so that the column of cigarettes on surface 181 is somewhat lower than that on surface 182 in order that a properly arranged batch of 7—6—7 cigarettes can be ejected. A pusher 183 is used in the arrangement shown in FIGURE 8 and a pusher 184 is used in FIGURE 9. The pushers each comprise a number of thin plates 183A and 184A respectively which pass through the slots between the vanes and eject the cigarettes. Pusher 184 will be described first. Each plate 184A has a vertical pushing face 185 which ejects the cigarettes and a support face 186 which holds up the rest of the column of cigarettes in a slot as the ejection takes place, the pusher than being lowered to bring the remaining cigarettes of the columns down to the feeding level. Pusher 184 pushes the cigarettes a short distance and then into a charger 10C, whose cells are bell-mouthed as shown in FIGURES 8 and 9. The pusher 183 is differently shaped because it pushes cigarettes from a set of vanes which are more remote from the charger. This pusher has two pushing faces 187 and 188 on each plate 183A. During the initial stroke, that is, when the machine first starts, each face 187 moves a row of cigarettes out of the slot and delivers it to the position marked 189 and then the pusher is lowered as in the other case. On the next stroke each pusher face 187 acts in the same manner and the face 188 pushes the batch at 189 into the charger 10C.

It will of course be understood from the drawings and the previous description that all the cells of a charger are filled at one pushing stroke.

The pusher motions are derived from cams 190 and 191 fixed on a shaft 192 which is driven by an independent motor (not shown) arranged to drive the pushers in synchronism with the machines so that when the cigarette machines and the packing machine are all working properly the cigarettes are moved into the chargers at the same rate as the packing machine is emptying the chargers.

Cam 190, FIGURE 9, engages a roller 193 on a lever 194 pivoted at 195 and links 196 attached to the lever 194 move the pushers along guide channels 197 in which rollers 198 attached to the pushers run. As can be seen from FIGURE 7 the lever 194 is a wide structure with a link 196 at each side. This motion ejects cigarettes as previously described. The raising and lowering movements of the pushers are effected by a cam 191, FIGURE 8, which engages a roller 199 on a lever 200, also pivoted at 195. The upper end of the lever 200 is slotted at 201 and a roller 202 runs in the slot. The roller is attached to one arm 203 of a bell-crank lever pivoted at 204 and the other arm 205 of the bell-crank lever is pivoted at 206 to the guide channel 197. A link 207 couples the bell-crank lever to another of like construction pivoted at 208. It will be seen from FIGURE 7 that the parts for raising and lowering the pusher as just described are located at one side of the structure and the channel guide 197 at the right-hand side is actuated by bell-crank levers 209 and 210, see also FIGURE 9, which operate in exactly the same manner as those first described but are inverted for structural convenience. Both guide channels are therefore raised and lowered at the same time and moving parallel to themselves cause the pushers to execute the desired movements.

The empty chargers returning from the packing machine were, for ease of explanation of FIGURE 2, shown and described as being moved down to the filling position by a platform 150 but the actual arrangements are fairly complex and the chargers are fed downwards to the filling position in the following manner. The returning chargers are moved over a support 211 on to ledges 212 which are pivoted at 213 and slope slightly downwards at the far end, as shown in FIGURE 11. The ledges constitute catches and can be opened by devices described below to permit lowering of the charger.

A charger at the filling position rests on a platform 214, FIGURES 9 and 11, supported at each end by brackets 215 which can be raised and lowered as described later and are guided by rollers 216 which run in grooved tracks 217. The charger is held in position on the platform by movable hooks 218 which are pivoted at 219 and attached to a lever 220 having a roller 221 which, on an upward movement of the platform referred to later, runs into contact with a cam 222 which causes the lever to swing on the pivot and swing the hooks 218 anticlockwise in FIGURE 9 so as to release the charger. The lever is returned to the position shown by a spring 223, and a stop pin 224 controls the lever movement when the roller 221 runs off the top of the cam 222. This is a trap cam pivoted at 225 so that the roller 221 can run down behind the cam on a return movement.

The brackets 215 are raised and lovered by a link 226 which is connected to a lever 227 pivoted at 195 and operated by a cam 228 which engages a roller 229. In order to maintain the horizontal position of the platform during its up and down movements racks 230 constituted by taut chains are provided in each guide track 217 and sprocket wheels 231 run on these racks and function as pinions.

In operation the empty chargers are slid on to the ledges 212, while the latter are in the closed position, and up to an end stop 232. A filled charger on the platform at the filling position is moved upward by the platform 214 and then to the left in FIGURE 11 by reciprocating hooks 242, one being shown, and its left-hand end rides on the slope 153 while the rest is supported by the rising platform 214. When the charger referred to has moved clear of the platform, continued upward movement of the platform eventually brings it into contact with an empty charger resting on the ledges 212 and raises it to a horizontal position, as shown in chain lines in FIGURE 11, thus relieving the ledges of the weight of the charger. The ledges are then opened by a lever 233, FIGURE 9, which is operated by a link 234, the lever 233 having a pin 235 which works between jaws 236 on a lever 237 so that both ledges move outwards at the same time. The link 234 is pivoted to a lever 238 which is pivoted at 195 and has a roller 239 which engages a cam 240. After the empty charger has thus become supported entirely by the platform the hooks 218 close as the roller 221 runs off the upper end of the cam 222 and then the platform 214 moves down and the hooks ensure that the charger moves down with it. During the downward movement the roller 221 passes down the left-hand side, FIGURE 9, of the trap cam 222 and swings it on its pivot 225 against the tension of a spring 241 so that eventually the roller is at the lowest position and the cam is again in its operative position.

The hooks 242, which remove the filled charger from the platform 214, are moved to and fro by a reciprocating slide at the necessary times but this mechanism has been omitted for simplicity. When the right-hand end of a filler charger is about to leave the support of the platform 214 it is necessary to provide a further support for the charger, otherwise it would fall down on to the slope 153. For this purpose spring latches 243 are provided which are forced open by the moving charger and close to support it.

When the hooks 242 have dragged a filled charger to the extreme right of FIGURE 4, its leading end is lying on the level along which it is fed past the packing machine where pushers 120, FIGURE 1, eject batches from the charger and press them into pockets of the turrets 125. As the packing machine shown is a duplex machine and has two turrets and as there needs to be some clearance between them the arrangement for pushing batches from the chargers into the pockets is as shown in FIGURE 12.

The pushers 120 which move the cigarettes out of the chargers are spaced apart a distance of three cell pitches so that, as shown in the lower part of the figure, one pusher is aligned with the first cell and one with the fourth. As the first charger, at the start of an operation, comes along, the right-hand pusher clears its second cell, as in the upper part of the figure. The charger then moves two cell pitches and the pushers clear the first and fourth cells. Thereafter each pusher stroke clears two cells each time a charger stops after it moves two cell pitches. As the chargers all abut one another this ejection of two cells at a stroke continues throughout the running of the plant.

The necessary intermittent movement of the chargers is derived from a pair of pawls 30 attached to levers 31 which are oscillated by a connecting rod 32 driven by a crank disc 33, moving in timed relationship with the packing machine. The pawls engage notches 17 in the base of the charger, see FIGURE 3A and so that the charger moves two cell pitches per pawl stroke. An empty charger is moved to the left of FIGURE 2 and is then raised by a platform 29 which is fixed to a rod 38 guided by rollers 39 and moved up and down by a cam 35 and a spring, the cam being shaped to permit a very rapid downward movement of the platform so that it is in position to receive the next intermittently moved charger. A charger moved up in this manner is held by spring latches 244 identical with the latches 243 previously described. Empty chargers are moved back, until they go on to the platform 214, by a chain conveyor 70 mounted on sprocket wheels 71.

If the packing machine stops there will be a surplus of cigarettes while if a cigarette machine stops the supply of cigarettes will diminish.

A switch on the packing machine which closes if the machine stops, controls the movements of bands 160 and 161, conveyors 163 and 164 and chains 170 so as to cause surplus cigarettes to be fed to the reservoirs. Conversely if a cigarette machine stops, another switch will control the said bands conveyors and chains so that cigarettes will be dispensed from the reservoirs to make good the diminished supply to the hoppers, as called for by photocells which scan the cigarette levels in the hoppers. If the reservoirs become full while the guide trays are in the upper position a light cell which scans the tops of the reservoirs will cause the platforms to move farther down to increase the reservoir capacity.

These movements can be derived from reversible electric motors controlled by the switches and cells, but none of these parts are shown as control may be effected in any other obvious way.

It will of course be understood that these arrangements can only cover short stopping periods as a sustained shortage of cigarettes or a long stop of the packing machine means stopping the whole apparatus.

What I claim as my invention and desire to secure by Letters Patent is:

1. Apparatus for use in an automatic cigarette making and packing plant comprising a cigarette machine having a catcher band, a cigarette feeding hopper positioned to receive cigarettes from said band, said hopper having a number of slots in its base through which cigarettes can pass out of the hopper, means below the hopper to support the cigarettes in the slots, a pusher movable through the slots to remove batches of cigarettes therefrom by endwise movement, a rigid multi-cellular portable charger, support means for holding said charger in position to receive the batches in the charger cells, a conveyor system for removing filled chargers from said position and delivering the same to a packing machine for conveying emptied chargers from the packing machine to said support means, and a pusher movable through a cell of a charger adjacent said packing machine to transfer a batch to the packing devices of said packing machine.

2. Apparatus as claimed in claim 1 and comprising a reservoir for surplus cigarettes, reversible conveyor means for removing any surplus cigarettes accumulated in the cigarette-feeding hopper to said reservoir and for returning to the hopper such surplus cigarettes when the hopper supply is diminished, said reservoir having a movable cigarette support, and means for moving said support downward as cigarettes are delivered into the reservoir and for moving said support upward when cigarettes are to be returned to the hopper.

References Cited in the file of this patent

UNITED STATES PATENTS

| | | |
|---|---|---|
| 1,769,557 | Voigt | July 1, 1930 |
| 2,048,281 | Muller | July 21, 1936 |
| 2,682,983 | Ashcroft | July 6, 1954 |
| 2,995,880 | Henebry | Aug. 15, 1961 |